US012782793B2

(12) United States Patent
McClure

(10) Patent No.: US 12,782,793 B2
(45) Date of Patent: Nov. 3, 2026

(54) LIGHT ASSEMBLY AND METHOD FOR ILLUMINATING A SCENE

(71) Applicant: QUOS LLC, Duluth, GA (US)

(72) Inventor: Justin K. McClure, Duluth, GA (US)

(73) Assignee: QUOS LLC, Duluth, GA (US)

( * ) Notice: Subject to any disclaimer, the term of this patent is extended or adjusted under 35 U.S.C. 154(b) by 76 days.

(21) Appl. No.: 18/632,435

(22) Filed: Apr. 11, 2024

(65) Prior Publication Data

US 2025/0321466 A1 Oct. 16, 2025

(51) Int. Cl.

| | |
|---|---|
| ***G03B 15/02*** | (2021.01) |
| ***H04M 1/04*** | (2006.01) |
| ***H05B 45/10*** | (2020.01) |
| ***H05B 45/20*** | (2020.01) |

(52) U.S. Cl.

CPC .............. *G03B 15/02* (2013.01); *H04M 1/04* (2013.01); *H05B 45/10* (2020.01); *H05B 45/20* (2020.01); *G03B 2215/055* (2013.01); *G03B 2215/0567* (2013.01); *G03B 2215/0575* (2013.01); *G03B 2215/0589* (2013.01)

(58) Field of Classification Search

CPC .............. G03B 15/02; G03B 2215/055; G03B 2215/0567; G03B 2215/0575; G03B 2215/0589; H05B 45/20; H05B 45/10; H04M 1/04

See application file for complete search history.

(56) References Cited

U.S. PATENT DOCUMENTS

| | | | | |
|---|---|---|---|---|
| 4,755,838 A * | 7/1988 | Lemmey | ................ | G03B 17/12 362/16 |
| 7,318,652 B2 | 1/2008 | Pohlert et al. | | |
| 7,331,681 B2 | 2/2008 | Pohlert et al. | | |
| 7,429,117 B2 | 9/2008 | Pohlert et al. | | |
| 8,594,495 B2 | 11/2013 | Yang | | |
| D702,279 S | 4/2014 | Zhan | | |
| 8,702,255 B2 | 4/2014 | Baxter et al. | | |

(Continued)

FOREIGN PATENT DOCUMENTS

| | | |
|---|---|---|
| JP | 2016027348 A | 2/2016 |
| JP | 2018015731 A | 2/2018 |

(Continued)

*Primary Examiner* — Evan P Dzierzynski
*Assistant Examiner* — Jessica M Apenteng
(74) *Attorney, Agent, or Firm* — Volpe Koenig

(57) ABSTRACT

A light assembly for photography/videography having a housing and a U-shaped light frame at a front of the housing. A PCB is located in the U-shaped frame and a plurality of LEDs/lighting elements are mounted thereon. A filter or diffuser is mounted to a front of the U-shaped light frame. A power source in the housing is connected to a driver circuit for the LEDs/light source, and the driver circuit is electrically connected to the PCB. Two length-adjustable support arms are connected between the housing and the base. An adjustable clamp is located on the housing to retain a mounting plate with attached camera in a position such that the camera lens is aligned between the two legs and above the base and is adjustable toward and away from the U-shaped light frame via the two length-adjustable support arms. A smart phone bracket is also connectable to the light assembly.

19 Claims, 12 Drawing Sheets

(56) References Cited

U.S. PATENT DOCUMENTS

| | | | | |
|---|---|---|---|---|
| 8,774,618 | B1* | 7/2014 | Muzila | F16M 11/10 396/198 |
| D717,857 | S | 11/2014 | Fong | |
| 8,882,283 | B2 | 11/2014 | Baxter et al. | |
| 8,905,562 | B1 | 12/2014 | Ghionis | |
| 9,010,948 | B2 | 4/2015 | Lee et al. | |
| D759,145 | S | 6/2016 | Lee et al. | |
| 9,395,068 | B2 | 7/2016 | Song et al. | |
| 9,588,402 | B2 | 3/2017 | Baxter et al. | |
| 9,781,779 | B2 | 10/2017 | Vinther et al. | |
| 10,006,609 | B2 | 6/2018 | Baxter et al. | |
| D862,566 | S | 10/2019 | Fahlborg | |
| D864,467 | S | 10/2019 | Mizobe | |
| D901,749 | S | 11/2020 | Chen | |
| D924,454 | S | 7/2021 | Xiong | |
| D927,046 | S | 8/2021 | Ikeda | |
| D927,583 | S | 8/2021 | Feng | |
| 2014/0130334 | A1* | 5/2014 | Chun | F16M 13/00 248/122.1 |
| 2015/0276187 | A1* | 10/2015 | Shoemake | G06F 1/1626 362/235 |
| 2020/0130605 | A1* | 4/2020 | Macneil | F16M 11/041 |
| 2024/0360854 | A1* | 10/2024 | Liu | F16M 13/022 |

FOREIGN PATENT DOCUMENTS

| | | | |
|---|---|---|---|
| JP | 2018015732 | A | 2/2018 |
| JP | 2018015733 | A | 2/2018 |
| JP | 2018015739 | A | 2/2018 |
| JP | 2018015740 | A | 2/2018 |
| JP | 2018015741 | A | 2/2018 |

* cited by examiner

LIGHT ASSEMBLY AND METHOD FOR ILLUMINATING A SCENE

TECHNICAL FIELD

The present invention is directed to a light assembly that is attachable to a camera or smart phone having a camera to provide illumination for a picture or scene.

BACKGROUND

Illumination systems for lighting a subject for film, photography, or video are known. Proper illumination with a desired intensity, color temperature and filtering can provide crisp images without shadows or undesired color reflection based on the color temperature and intensity of the lighting. Lighting can also be provided with filters to achieve other desired lighting effects.

Many known systems use separate lights that may be tri-pod mounted, or may be connected to the top of a camera in the known accessory slot (sometimes referred to as a "hot shoe"), if present.

U.S. Pat. No. 7,429,117 discloses a lighting frame that is ring-shaped and can be located around a camera lens. Light is provided by an LED field, arranged in linear rows on the ring-shaped frame. This ring-shaped frame can be mounted to the camera via a camera bracket having a U-shaped clamp. Separate arrays of LED lighting can also be provided that are tri-pod mounted.

The known lights require special brackets to mount, for example, to moving picture cameras. Further, no accommodation is made for lens size or other camera-mounted accessories.

It would be desirable to provide a light assembly for illumination of a picture or scene for photography or videography that is easily configurable for different types of cameras and smart phones that are often used for photography and videography, that is also easy to use.

SUMMARY

In one aspect, a light assembly is provided that includes a housing and a U-shaped light frame connected at a front of the housing. The U-shaped light frame includes a base and two legs that extend up from opposite ends of the base that define an opening at a top of the U-shaped light frame between the two legs. A printed circuit board (PCB) is located in the U-shaped frame and has a corresponding U-shape, and a plurality of LEDs are mounted to the PCB, defining an LED field. Alternatively, a different light source can be provided. A filter or diffuser is mounted to a front of the U-shaped light frame in front of the LEDs/light sources, and preferably has a corresponding U-shape. A power source is located in the housing and is connected to a driver circuit for the LEDs/light sources, and the driver circuit is electrically connected to the PCB to power the LEDs/light sources. Two support arms are connected between the housing and the base, with the two support arms being length adjustable to allow adjustment of a distance between the housing and the U-shaped light frame. At least one of: a) a camera attachment is provided on the housing to which a camera is adapted to be fastened in a position such that a camera lens of the camera is aligned between the two legs and above the base and is adjustable toward and away from the U-shaped light frame via the two length-adjustable support arms, or b) a smart phone bracket is provided that is connectable to the light assembly to which a smart phone is adapted to be fastened to retain the smart phone in a position with a lens of the smart phone aligned between the two legs and above the base.

In one preferred arrangement, the camera attachment on the housing comprises an adjustable clamp located on an upper surface of the housing. The adjustable clamp includes two opposing jaws that are configured to engage and retain a mounting plate, which is adapted to be fastened to a camera, in a position such that a camera lens of the camera is aligned between the two legs and above the base and is adjustable toward and away from the U-shaped light frame via the two length-adjustable support arms. Here, the opposing jaws are configured to engage a variety of different mounting plates, which can be for example tri-pod mounting plates, that can be connected to the bottom of a camera in a known manner, for example using a thumb screw, so that various different cameras can be connected to the light assembly. Other camera attachments that engage with the standard tri-pod thread on the camera can be provided that are either part of or connectable to the housing via various connectors, clips or fasteners.

In one embodiment, the two opposing jaws on the upper surface of the housing are mounted for linear movement toward and away from one another, and a lead screw having first and second threaded sections is rotatably mounted in the housing, with the first threaded section engaging a complementary threaded section in a first one of the jaws and the second threaded section engaging a complementary threaded section in a second one of the jaws. The first threaded section has an opposite-handed thread to the second threaded section. Preferably, a knob is located on one end of the lead screw that extends out of the housing which can be used to manually actuate the opposing clamping jaws to clamp onto a mounting plate with a camera attached thereto.

When provided, the smart phone bracket can be connectable to the base, preferably removably, with the smart phone bracket including a mounting post that is connectable to the base at a first end, for example with a connector such as a thumb screw that is engaged in a mating thread in the base. A smart phone clamp is connected to a second end of the mounting post. The smart phone clamp includes a moveable jaw and an opposite jaw, with the moveable jaw being moveable toward the opposite jaw to retain the smart phone in a position with a lens of the smart phone aligned between the two legs and above the base. Here, the moveable jaw can be spring biased toward the opposite jaw which can be fixed. Alternatively, both jaws of the smart phone clamp can be moveable. Various known mechanisms for adjusting the jaws of the smart phone clamp can be used. With this accessory smart phone bracket, the light assembly can also be easily connected to a smart phone in order to use the camera for photography or videography with professional-style lighting from the light assembly-which allows for easy conversion of the light assembly from use with traditional cameras to use with smart phones.

In one embodiment, a pivotable cradle is optionally located between the smart phone clamp and the second end of the mounting post. The pivotable cradle is adapted to allow an angle adjustment of the pivotable cradle toward and away from the U-shaped light frame such that an inclination of the smart phone lens of the smart phone held in the smart phone bracket relative to the light assembly is adjustable. The pivotal connection for the pivotable cradle can be, for example, a pin connection or a ball and socket connection.

In one embodiment, the front of the U-shaped light frame includes a receiving channel along outer edges of each of the legs and a stop along a lower edge of the base. The filter or diffuser is slidable from above the U-shaped light frame into the receiving channels on each side and is retained by a bottom edge of the filter or diffuser contacting the stop. This arrangement allows for easy exchange of filters or diffusers for particular conditions by simply sliding them into and out of position in the receiving channels. No catch is necessary at the top, although a releasable catch could be optionally provided.

In one embodiment, the two support arms each include an inner arm connected to one of the U-shaped light frame at the base or the housing, and an outer arm connected to the other of the U-shaped light frame at the base or the housing. The outer arm includes a receiving space for the inner arm and the inner arm is slidably engaged in the receiving space of the outer arm with a friction fit in order to allow adjustment of the length of the support arm. The outer arms may be tubular or may have another shape that allows telescoping of the inner arms within the respective outer arms. In one preferred arrangement, the outer arms are formed integrally with the housing. The inner and outer arms may optionally be retained relative to one another by a catch arrangement, such as a push button that is biased outwardly into one aperture in a row of apertures in order to have a plurality of position adjustments for the support arm length.

In one embodiment, the power source is a battery located in the housing, and a charging connection is also provided in the housing, such as a USB port.

In one embodiment, the driver circuit for the LEDs/light sources includes a controller for adjustment of a temperature and an intensity of the LEDs/light sources, and a user control interface is located on the housing that is adapted to signal the controller to adjust the temperature and the intensity. The user control interface may include a central button that toggles control between the temperature and the intensity of the LEDs/light sources, and a rotatable ring that surrounds the central button and rotates to adjust a selected one of the temperature or the intensity of the LEDs/light sources. A display screen can also be provided on the housing that displays the selected one of the temperature or the intensity and a setting for the temperature and the intensity. In one preferred embodiment, the temperature is adjustable from 2000 k-7000 k, and the intensity is adjustable from 0% to 100%.

In another aspect, a method of illuminating a scene for photography or videography, is provided. The method includes providing the light assembly having one or more of the features disclosed herein, attaching a camera to a mounting plate, and inserting the mounting plate with the attached camera between the two opposing jaws of the adjustable clamp located on an upper surface of the housing, and clamping the two opposing jaws against the mounting plate to affix the camera to the light assembly. The method further includes adjusting a length of the two support arms such that a lens of the camera is positioned in proximity to or between the legs to avoid shadowing, illuminating the scene with the LEDs/light sources, and then activating the camera to capture the scene.

The method may further include attaching a microphone to a top of the camera, and extending the microphone through the opening at the top of the U-shaped light frame.

The method may further include adjusting a temperature and an intensity of the LEDs using a user control interface located on the housing. In a preferred aspect of the method, the temperature is adjusted to between 3300 k and 5500 k, and the intensity is adjusted from 5% to 100% of the available light intensity, for example 1500 LUX. This can be done by pressing the central button so that the temperature selection is adjustable, and then rotating the rotatable ring so that the controller adjusts the temperature, with the temperature adjustment shown on the display screen. The intensity can be adjusted by pressing the central button again to toggle to the intensity adjustment, and then rotating the rotatable ring so that the controller adjusts the intensity, with the intensity adjustment then being shown on the display screen.

In another aspect, a method of illuminating a scene for photography or videography, is provided which is specifically for use of smart phones. This method includes attaching the first end of the mounting post of the smart phone bracket to the base, and clamping a smart phone into the smart phone clamp with the lens of the smart phone aligned between the two legs and above the base. The method then includes illuminating the scene with the LEDs/light sources, and activating the camera to capture the scene.

The present lighting assembly can be used with various different types of cameras and smart phones based on its construction while also providing adjustability for the lens position at or near the U-shaped light frame to avoid shadowing, while also allowing further accessories, such as a microphone to be attached in position on top of the camera in an unobstructed manner.

It is noted that various ones of the above-noted features can be used alone or in combination with one another.

BRIEF DESCRIPTION OF THE DRAWINGS

The foregoing summary, as well as the following detailed description will be better understood when read in conjunction with the appended drawings, which illustrate a preferred embodiment of the invention. In the drawings.

DETAILED DESCRIPTION

Figure 1:
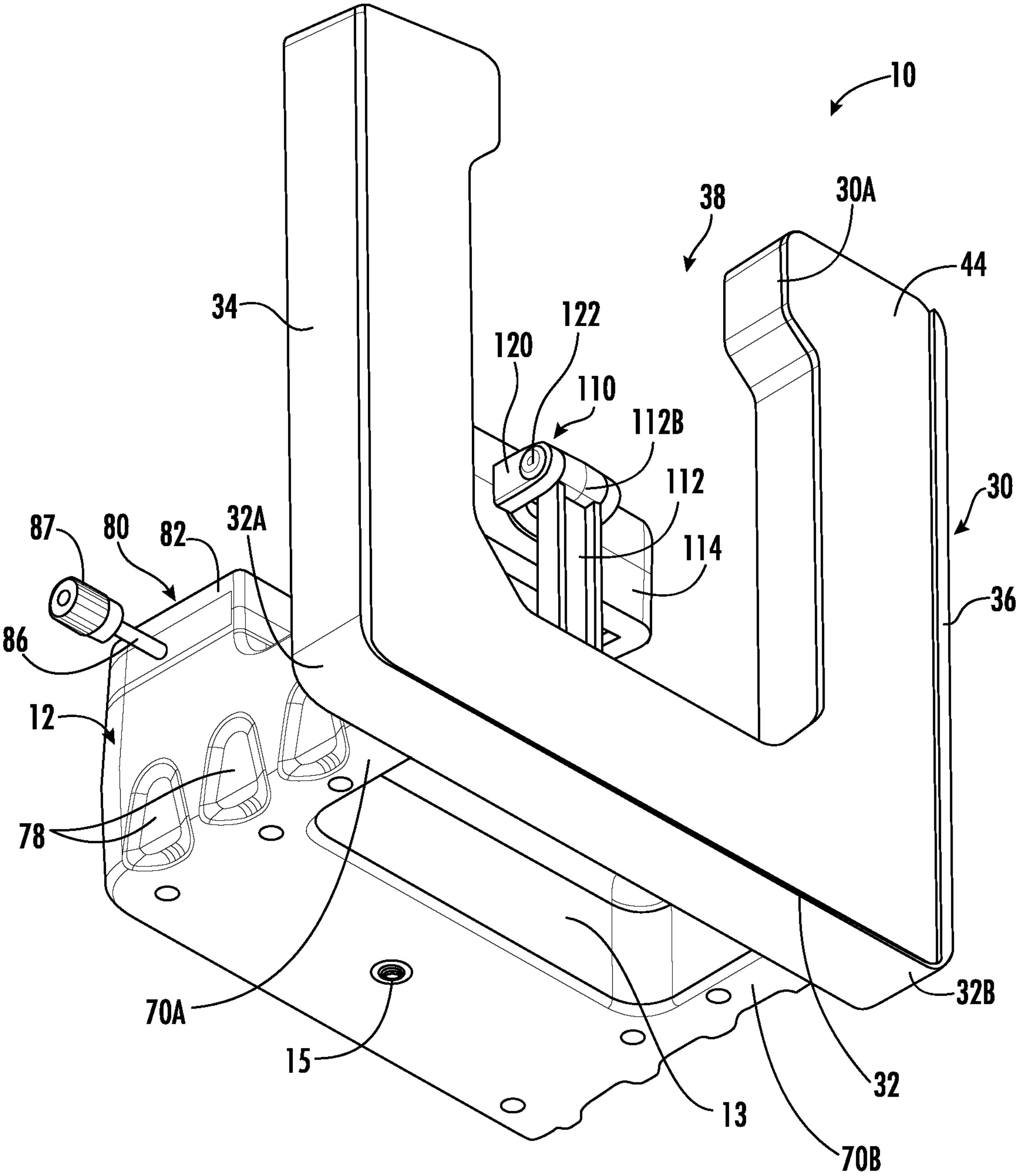
FIG. 1 is a perspective view of a first embodiment of a light assembly shown with an optional smart phone bracket.
Figure 2:
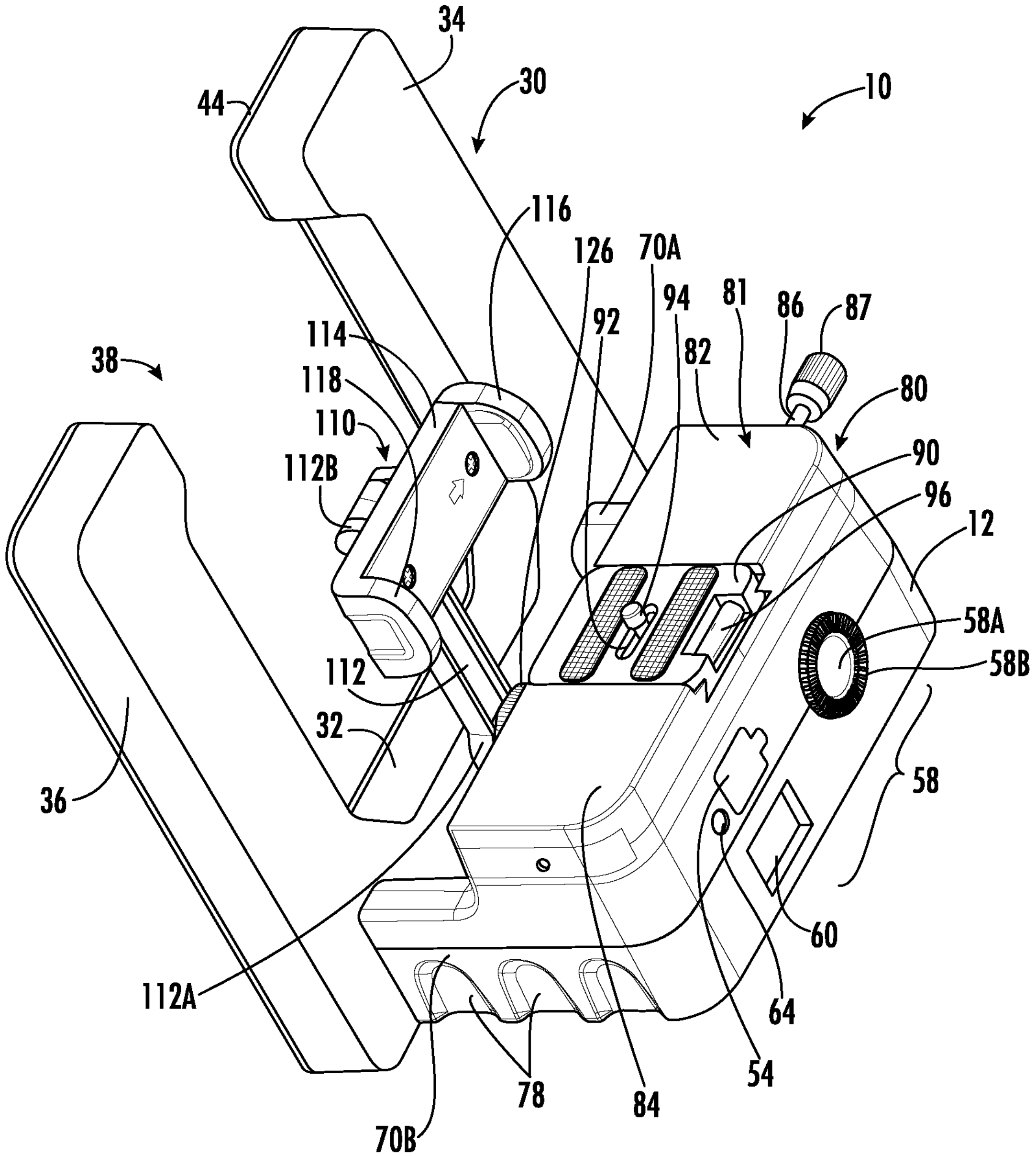
FIG. 2 is a perspective view of the light assembly of FIG. 1 shown from the back to illustrate the adjustable clamp for mounting a camera as well as the optional smart phone bracket.
Figure 3:
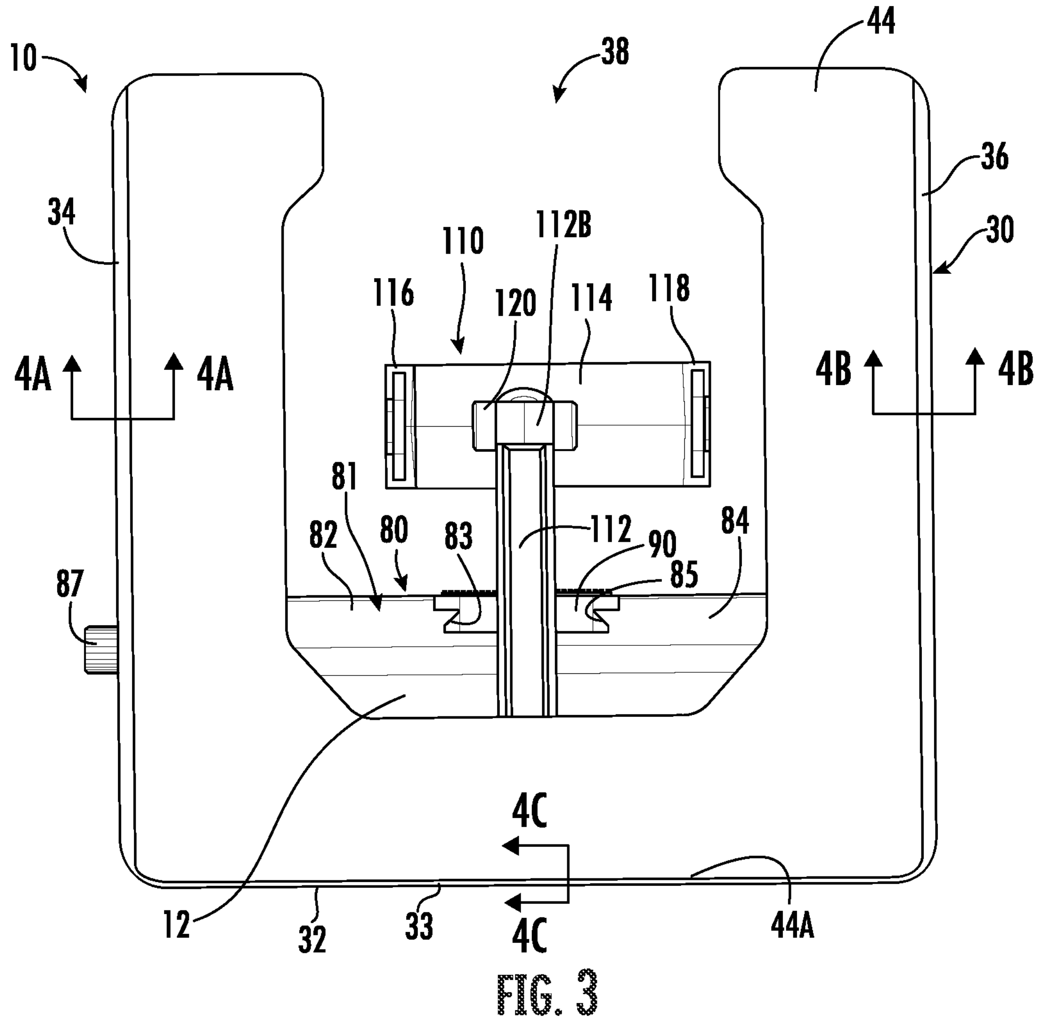
FIG. 3 is a from elevational view showing the U-shaped light frame at the front of the light assembly, with the optional smart phone bracket also being illustrated.
Figure 4A:
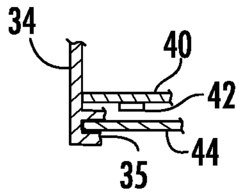
FIGS. 4A, 4B, and 4C are cross-sectional views taken at the indicated section lines in FIG. 3 to show the filter or diffuser mounted in receiving channels at the front of the U-shaped light frame, as well as the PCB that includes LEDs mounted thereon located behind the filter or diffuser.
Figure 4B:
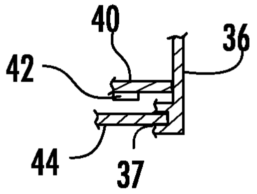
Figure 4C:
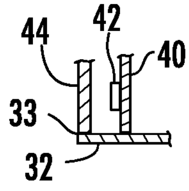

Certain terminology is used in the following description for convenience only and is not limiting. The words "inwardly" and "outwardly" refer to directions toward and away from the parts referenced in the drawings. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Referring to FIGS. 1-16, a light assembly 10 that is configured for use of various cameras 100 and/or smart phones 104 to provide lighting for photography or videography is shown. The light assembly 10 provides illumination for a picture or scene and is easily configurable for different types of cameras 100 and/or smart phones 104 that are often used.

The light assembly 10 includes a housing 12 shown in detail in FIGS. 1, 2, 6-10 and 12-14, along with a U-shaped frame light frame 30 that is connected at a front 13 of the housing 12. The U-shaped light frame 30, shown in detail in FIGS. 1-5, includes a base 32 and two legs 34, 36 that extend up from opposite ends 32A, 32B of the base 32 that define an opening 38 at a top of the U-shaped light frame 30 between the two legs 34, 36. The U-Shaped light frame 30 can be molded from a polymeric material in one or more pieces.

Figure 5:
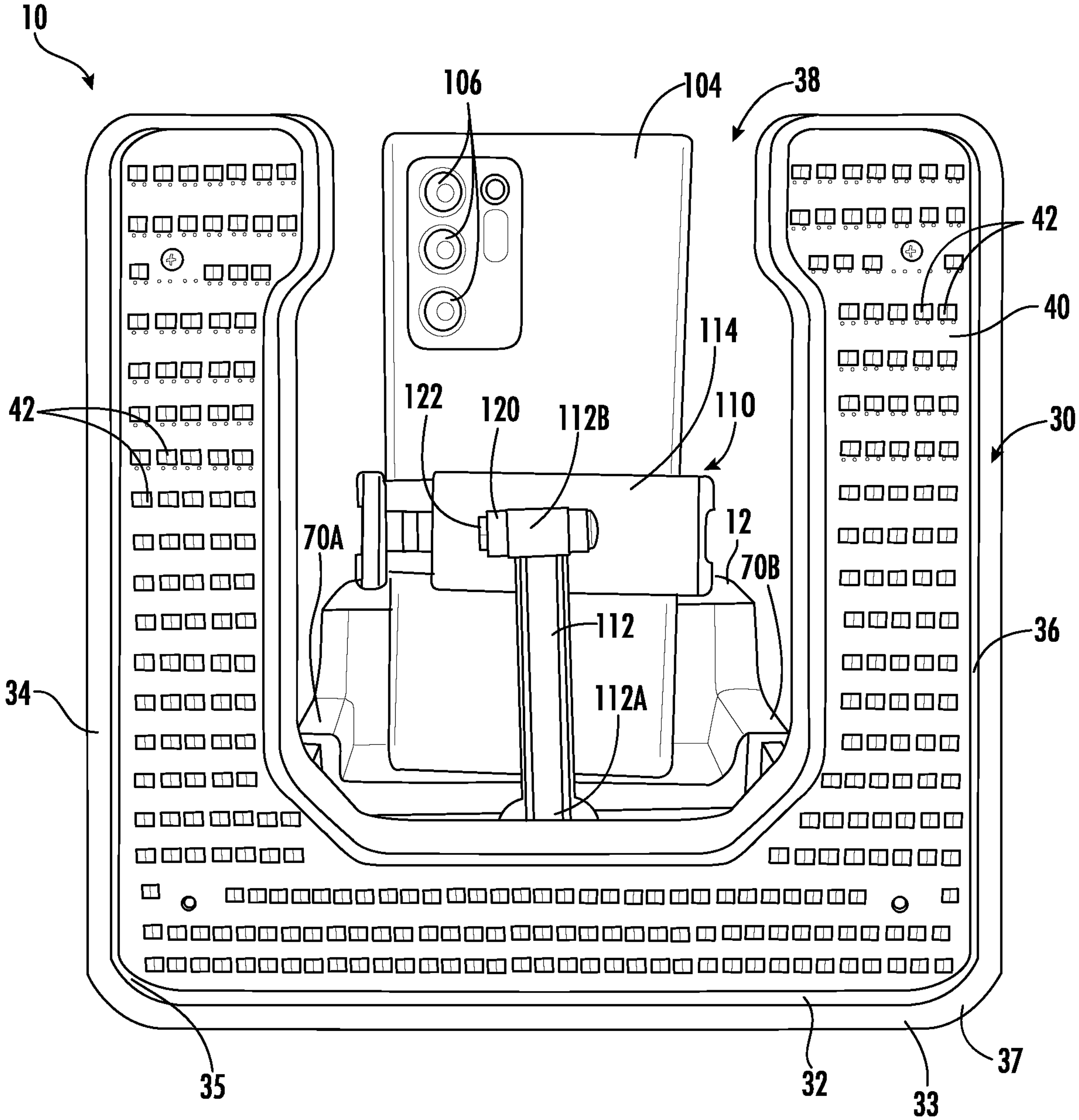
FIG. 5 is a front view similar to FIG. 3 showing the U-shaped light frame without the filter or diffuser so that the LED field on the PCB is illustrated. Additionally, a smart phone is shown mounted in the optional smart phone bracket.

Referring specifically to FIG. 5, a printed circuit board (PCB) 40 is located in the U-shaped light frame 30 and has a corresponding U-shape. A plurality of LEDs 42 are mounted to the PCB 40. Alternatively, other types of light sources such as filament or incandescent lights could be used. LEDs are the preferred light source; however, further references to the LEDs 40 will interchangeably also refer to other light sources. The number and type of LEDs 40 or other light sources can be varied in order to achieve a desired maximum light intensity, for example of 1500 LUX (lumens per square meter). However, the specific number and wattage of the LEDs 42 can be varied depending upon the particular application. For example, in the illustrated embodiment there are 17 rows of LEDs 42 per leg with the rows including a minimum of five LEDs 42, except in the mounting area shown at the tops of the legs 34, 36 in FIG. 5. Additionally, the tops of the two legs 34, 36 can be wider than the remainder of the legs 34, 36 in order to accommodate additional LEDs 42 for more uniform lighting around the entire periphery of the lens 102 of the camera 100 (shown for example in FIGS. 15 and 16) or lens 106 of the cell phone 104 (shown for example in FIGS. 5 and 9) mounted in the light assembly 10. For example, in the illustrated embodiment the top two rows of LEDs 42 for each of the legs 34, 36 includes seven LEDs 42.

Further, in the illustrated embodiment, three rows of LEDs 42 are located in the base 32 of the U-shaped light frame 30, with each of these rows including 30 or more LEDs 42. The specific number of LEDs 42 and arrangement of the field of LEDs 42 in the legs 34, 36 can vary. Additionally, the LEDs 42 may be connected to a heat sink, not shown, or some or all of the U-Shaped light frame 30 could be formed of a heat sink material, such as aluminum. Other heat dissipation arrangements could also be provided, such as a cooling fan As shown in FIGS. 1, 3, 4A, and 4B, the front 30A of the U-shaped light frame 30 preferably includes a receiving channel 35, 37 along the outer edges 34A, 36A of each of the legs 34, 36, as well as stop 33 located along a lower edge 32B of the base 32. The filter or diffuser 44 is slidable from above the U-shaped light frame 30 into the receiving channels 35, 37, and is retained by a bottom edge 44A of the filter or diffuser 44 contacting the stop 33, shown in FIG. 4C. Here, the diffuser or filter 44 can be made of a plastic material and can either be used to diffuse the light or filter the light. The plastic material can be transparent or translucent, and may be made with different colors. In the illustrated embodiment, a single filter or diffuser 44 is shown. However, the receiving channels 35, 37 could be sized to accommodate one or more such filters or diffusers 44. Other means for attaching the filter or diffuser 44 could also be provided.

Figure 11:
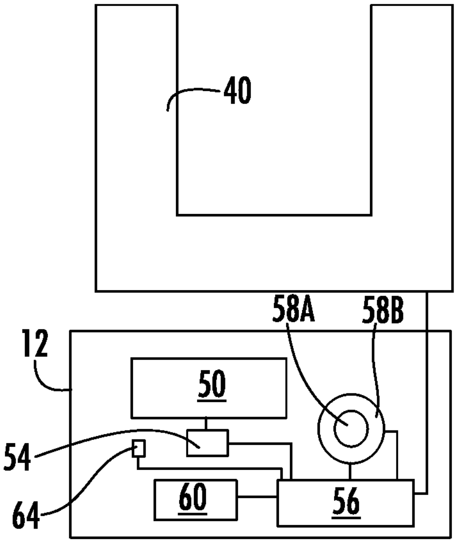
FIG. 11 is a schematic functional view showing the power supply, LED driver, display screen, control button as well as the PCB on which the LEDs are mounted.

As shown in FIG. 11, a power source 50 is located in the housing 12 and is connected to a driver circuit 52 for the LEDs 42. The driver circuit 52 is electrically connected to the PCB 40 to power the LEDs 42.

The power source 50 can be a battery located in the housing 12 and a charging connection 54 can be provided in the housing 12 for charging the battery. Additionally, power may be directly be taken through the charging connection 54 for powering the light assembly 10.

Figure 10:
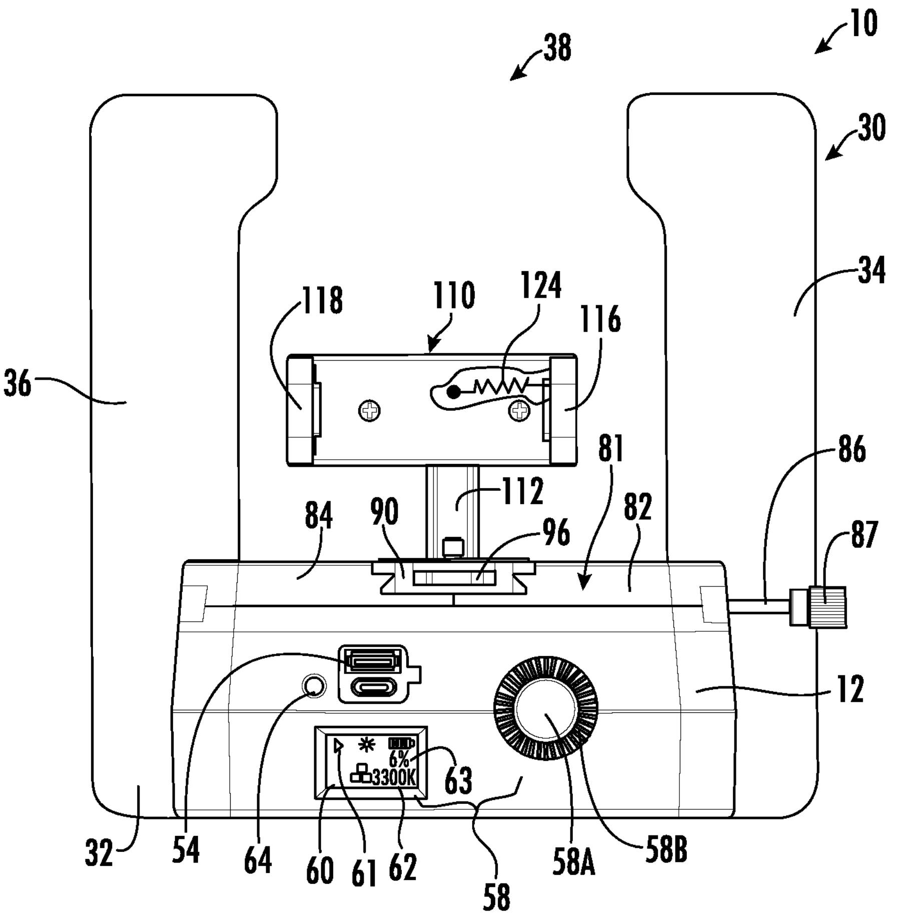
FIG. 10 is a rear-elevational view of the light assembly shown in FIG. 1 shown with the optional smart phone bracket. Here the user interface, control button and display screen are shown in detail.

The driver circuit 52 for the LEDs 42 includes a controller 56 for adjustment of a temperature and an intensity of the LEDs 42. A user control interface 58, schematically indicated in FIG. 11 and shown in detail in FIG. 10, is located on the housing 12 and is adapted to signal the controller 56 to adjust the temperature and the intensity of the light that is provided by the LEDs 42.

In one preferred arrangement, the user control interface 58 includes a central button 58A that toggles control between the temperature and the intensity of the LEDs 42, as well as a rotatable ring 58B that surrounds the central button 58A and is rotated in order to adjust a selected one of the temperatures and the intensity of the LEDs 42. The rotatable ring 58B can be connected to a potentiometer or other solid state control. A display screen 60 is optionally provided that displays the selected one of the temperature or the intensity, indicated at 61, as well as a setting for the temperature, indicated at 62, and the intensity, indicated at 63. An on/off switch 64 is also provided.

In a preferred arrangement, the temperature is adjustable from 2000 k-7000 k, more preferably between 3300 k and 5500 k. The intensity can be adjustable from 0% to 100% of the maximum available light intensity, which can be for example 1500 LUX. Further, additional control options may be provided by the controller 56. For example, it is possible to provide a full power function wherein when the central button 58A is pressed for example, for a continuous period of time, such as two seconds or more, the controller 56 is configured to adjust the intensity to 100% without the need for using the rotatable ring 58B. Other control features can also be provided depending on the particular application.

Figure 15:
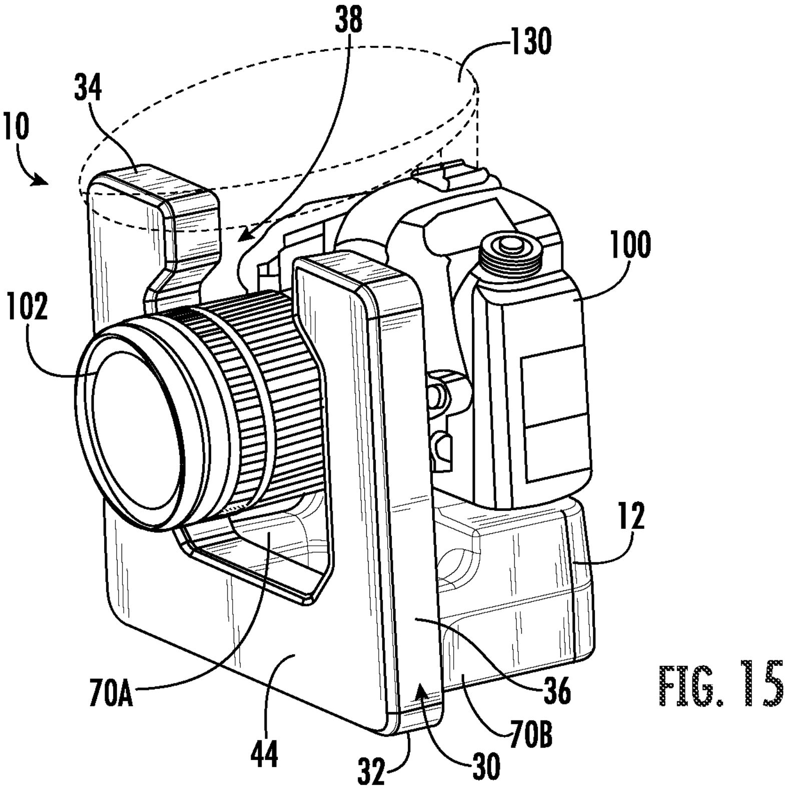
FIG. 15 is a perspective view of a further embodiment of the light assembly illustrated with a camera connected to the housing by the adjustable clamp, with the camera including a microphone extending from the top that extends at least partially through an opening at the top of the U-shaped light frame.
Figure 16:
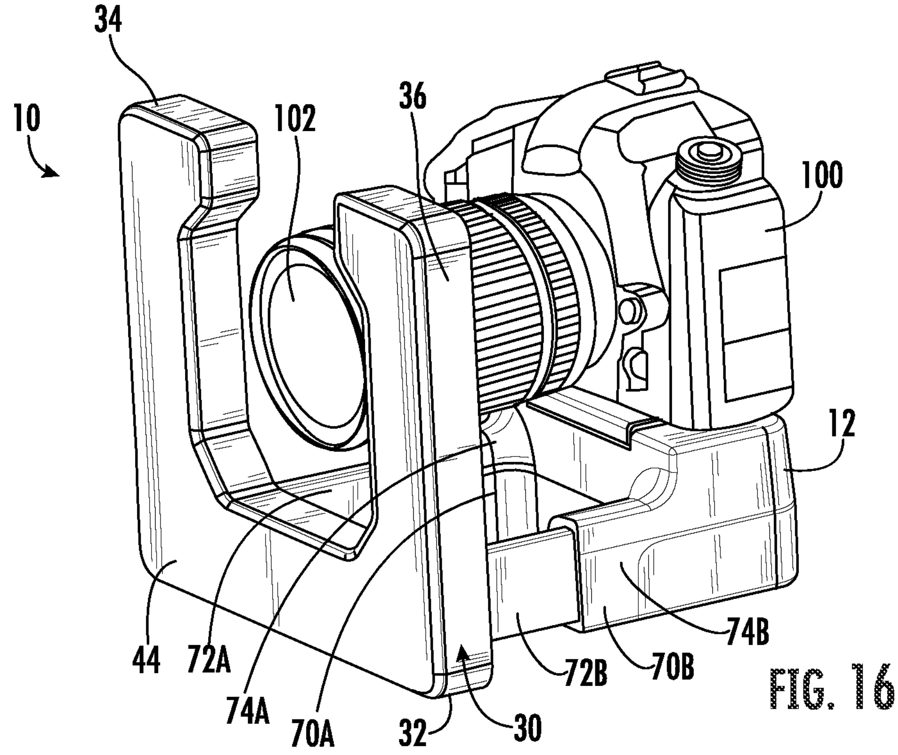
FIG. 16 is a perspective view similar to FIG. 15 showing the light assembly with a camera connected to the adjustable clamp located at the upper surface of the housing, shown with the support arms extended such that the camera lens is at or in proximity to the U-shaped light frame assembly in order to prevent shadowing.
Figure 17:
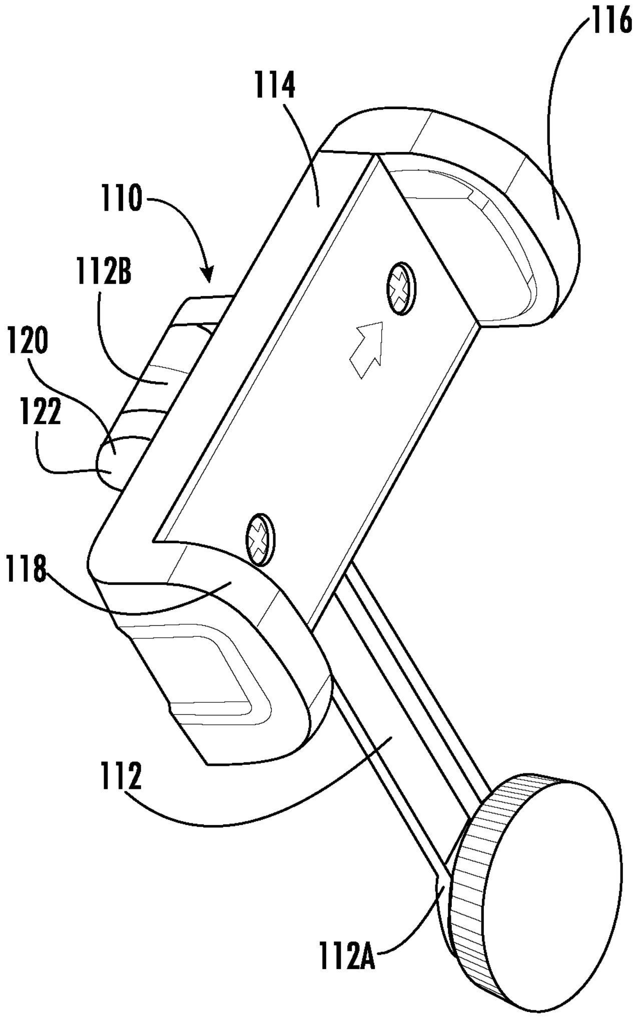
FIG. 17 is a perspective view of the smart phone bracket shown separately.

As shown in detail in FIGS. 2, 7, 8, 15, and 16, two support arms 70A, 70B are connected between the housing 12 and the base 32. The two support arms 70A, 70B are length adjustable, in order to allow adjustment of a distance D between the housing 12 and the U-shaped light frame 30. As illustrated in comparing FIGS. 15 and 16, this can be used in order to adjust the position of the U-shaped light frame 30 with the LEDs 42 to a position that prevents shadowing from the lens 102 of the camera 100 for example, as shown in FIG. 16. The adjustment of the support arm 70A, 70B allows the present light assembly 10 to accommodate various different cameras 100 as well as different length lenses 102.

Figure 8:
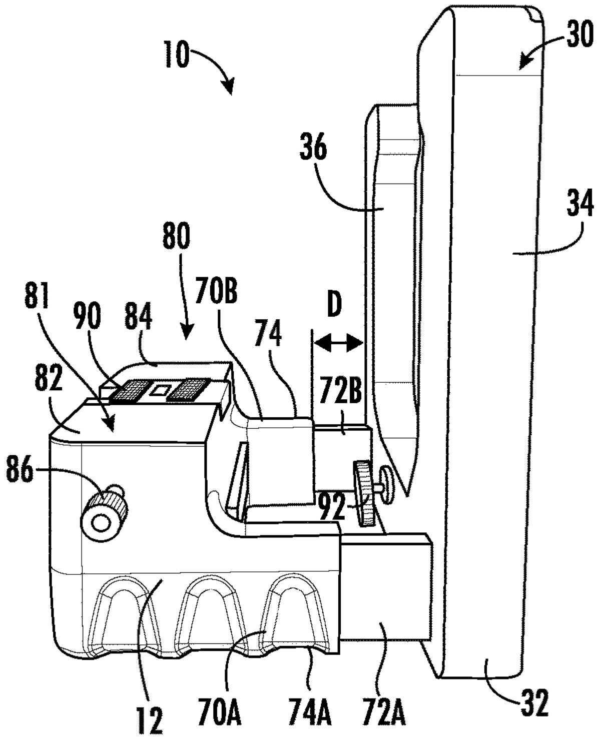
FIG. 8 is a right-side perspective view of the light assembly showing the arrangement without the optional smart phone bracket as well as with the support arms connected between the housing and the base of the U-shaped light frame shown in an extended position.

In the embodiment illustrated at FIGS. 8 and 16, the two support arms 70A, 70B are shown as each including an inner arm 72A, 72B that is connected to one of the U-shaped light frame 30 at the base 32 or the housing 12, as well as an outer arm 74A, 74B connected to an other of the U-shaped light frame 30 at the base 32 or the housing 12. In the illustrated embodiment, the inner arms 72A, 72B are connected to the base 12, and the outer arms 74A, 74B are connected to the housing 12. However, this could easily be reversed. The outer arms 74A, 74B each include a receiving space 76*a*, 76*b* for slidably receiving the respective inner arm 72A, 72B. In the illustrated embodiment, the inner arms 72A, 72B are slidably engaged in the receiving space 76*a*, 76*b* of the outer arms 74A, 74B with a friction fit. This allows adjustment of the length of the support arm 70A, 70B in an easy manner and the friction fit holds the support arm 70A, 70B at the desired length.

In one preferred arrangement shown in FIGS. 1, 2, and 7-9, the outer arms 74A, 74B are formed integrally with the housing 12. In one preferred arrangement, the housing 12 can be formed in two parts that are molded from a polymeric material, and the outer arms 74A, 74B are also formed integrally as part of the two housing parts. As shown for example, in FIGS. 1, 7, and 8, finger grips 78 can be provided on the outer arms 74A, 74B in order to allow easier grip by a user.

The inner arms 72A, 72B may be integrally molded with the U-shaped light frame 30, or formed separately and attached thereto.

While the outer arms 74A, 74B are shown with a generally tubular rectangular form, these could have an open frame design or be in the form of a C-shaped channel, for example.

Figure 9:
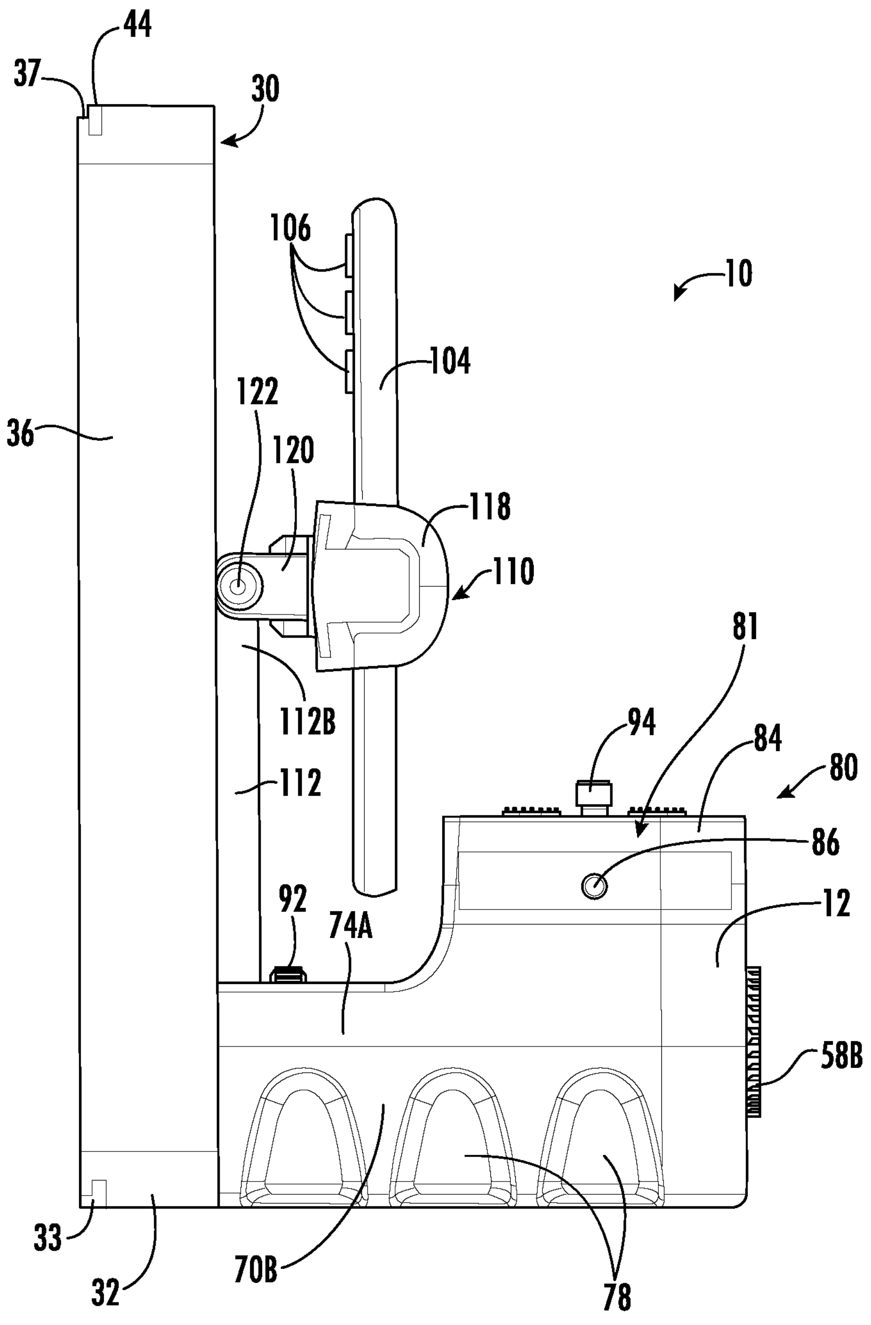
FIG. 9 is a left-side elevational view of the light assembly shown in FIG. 1 illustrated with a smart phone mounted in the optional smart phone bracket.

As shown in FIGS. 15, 16 in comparison to FIGS. 5 and 9, at least one of a) a camera attachment 80 is provided on the housing 12 of the light assembly 10 to which a camera 100 is adapted to be fastened in a position such that a camera lens 102 of the camera 100 is aligned between the two legs 34, 36 and above the base 32 and is adjustable toward and away from the U-shaped light frame 30 via the two length-adjustable support arms 70A, 70*b*, or b) a smart phone bracket 110 is provided that is connected to the light assembly 10 to which a smart phone 104 is adapted to be fastened to retain the smart phone 104 in a position with a lens 106 of the smart phone 104 aligned between the two legs 34, 36 and above the base 32. In a preferred embodiment, both the camera attachment 80 and the smart phone bracket 110 are provided. However, a light assembly 10 with only one of these options is also possible.

Referring to FIGS. 10 and 12-14, the camera attachment 80 can be an adjustable clamp 81 that is located on an upper surface 14 of the housing 12. The adjustable clamp 81 includes two opposing jaws 82, 84 that are configured to engage and retain a tri-pod or other type of camera mounting plate 90, which is adapted to be fastened to the camera 100, in position on the housing 12 such that the camera lens 102 of the camera 100 is aligned between the two legs 34, 36 and above the base 32 of the U-shaped light frame 30. Once mounted, the camera 100/camera lens 102 are adjustable toward and away from the U-shaped light frame 30 via the two length-adjustable support arm 70A, 70B to a desired position. For some photography applications, it is desirable to have a front of the camera lens 102 located at or in proximity to the U-Shaped light frame 30 in order to prevent shadowing.

Figure 12:
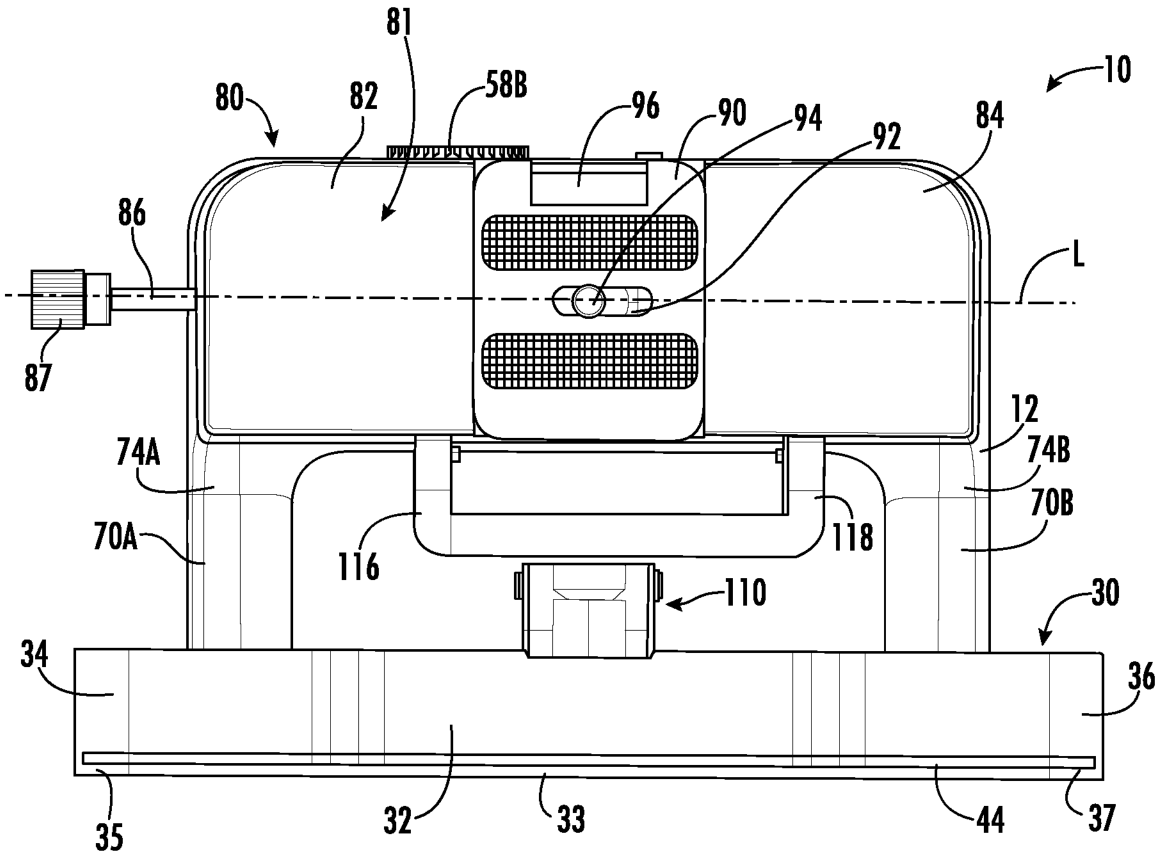
FIG. 12 is a top view of the light assembly shown in FIG. 1 with the optional smart phone bracket shown.
Figure 13:
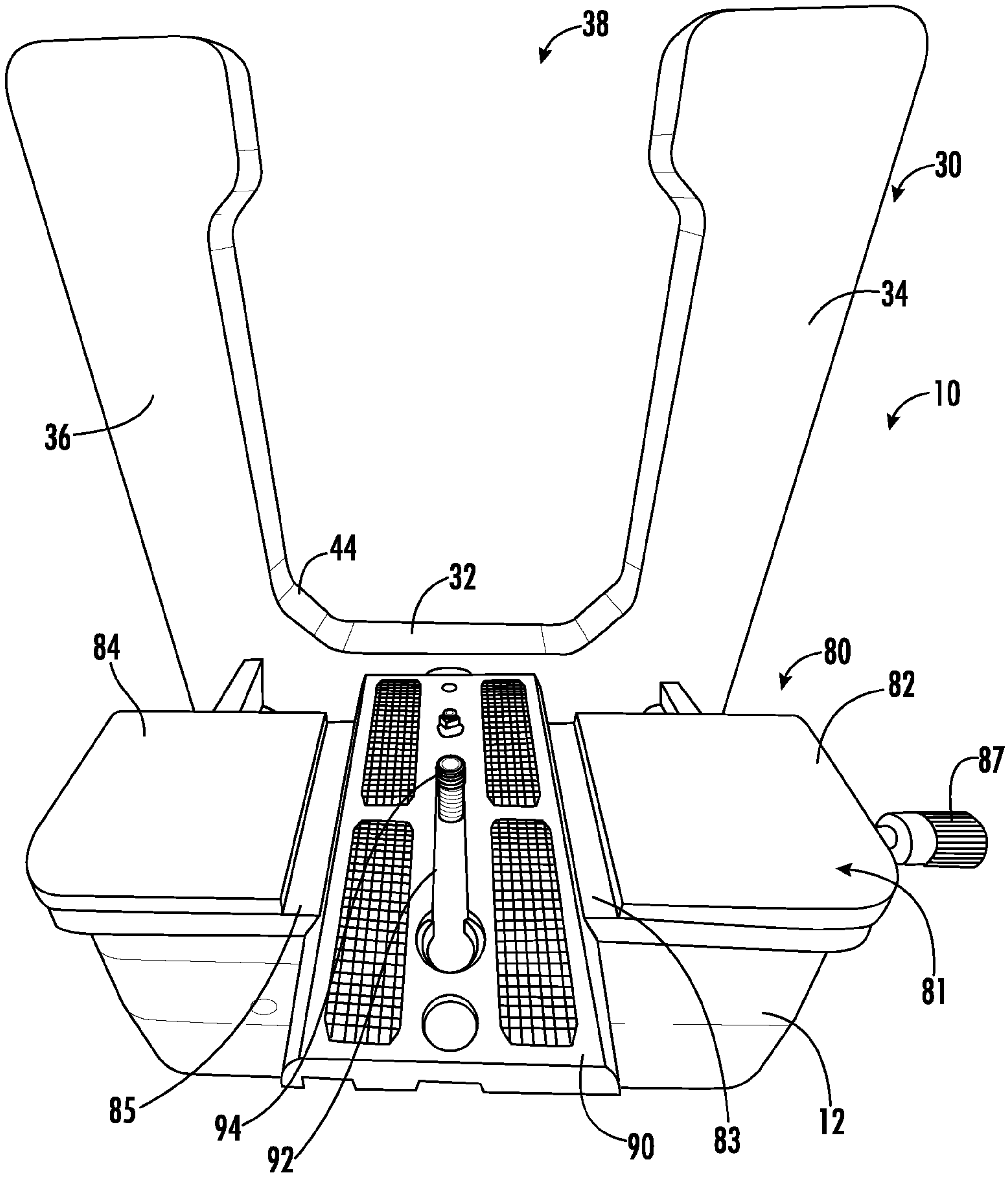
FIG. 13 is a top, rear perspective view of an embodiment of the light assembly shown with a different version of a tri-pod mounting plate engaged by the adjustable clamp that is located at the upper surface of the housing behind the U-shaped light frame.
Figure 14:
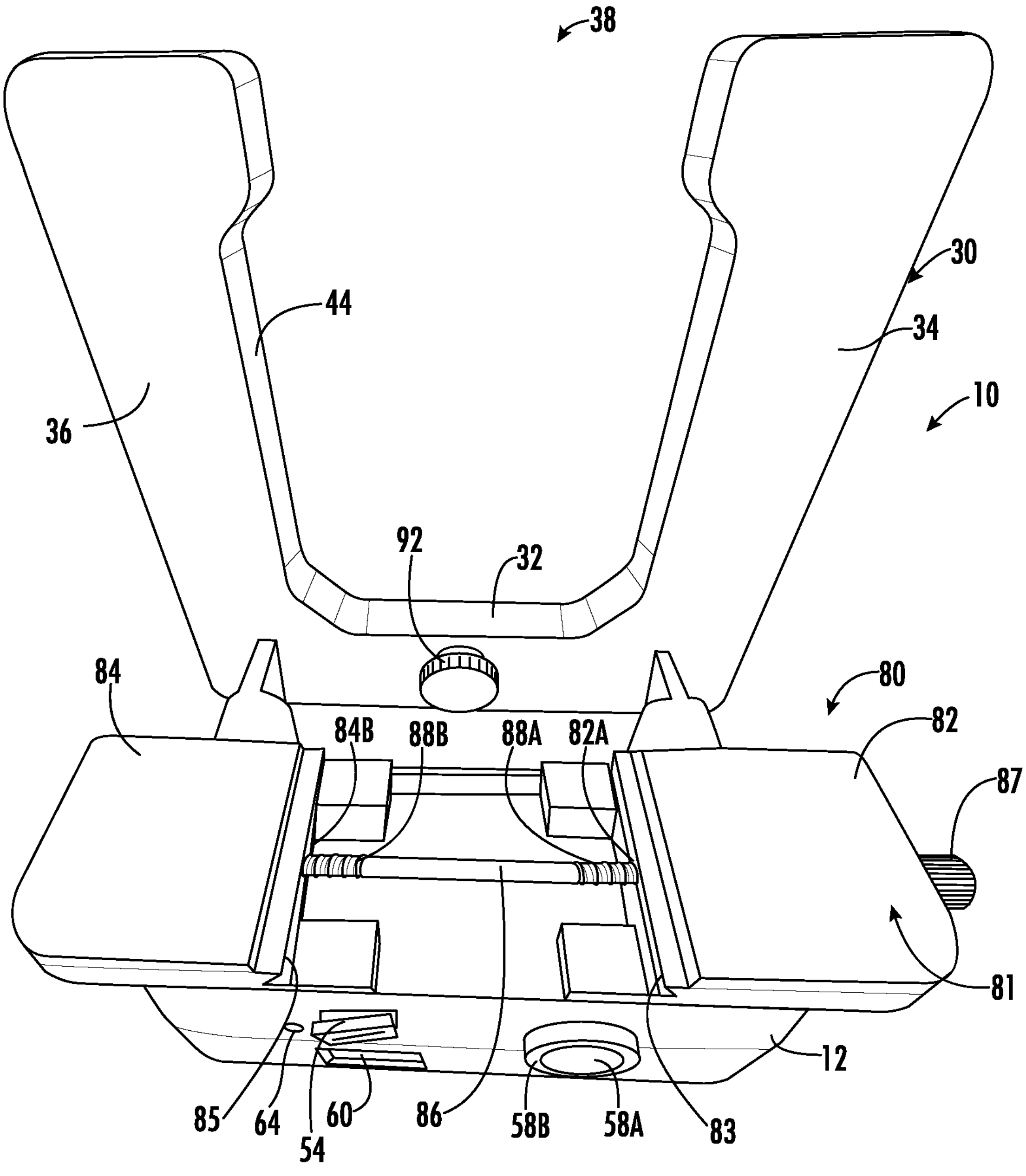
FIG. 14 is a top, rear perspective view similar to FIG. 13 showing the adjustable clamp with the opposing jaws in an open position ready to receive various sized mounting plates to which a camera can be attached.

The adjustable clamp 81 is adapted to accommodate many different sized mounting plates 90 with different exemplary embodiments being illustrated in FIGS. 12 and 13 which accommodate different sized cameras 100. The opposing jaws 82, 84 on the upper surface 14 of the housing 12 are mounted for linear movement for example, along line L in FIG. 12, toward and away from one another. A dual-lead screw 86, shown most clearly in FIG. 14, is provided having first and second threaded sections 88A, 88B and is rotatably mounted in the housing 12. The first threaded section 88A engages a complementary threaded section 82A and the first one of the jaws 82, and the second threaded section 88B engages a complementary threaded section 84B in the second jaw 84. The first threaded section 88A has an opposite-handed thread to the second threaded section 88B. A knob 87 can be provided at an end of the lead screw 86 in order to allow manual clamping and unclamping of the two opposing jaws 82, 84 by rotating the knob 87.

As shown in FIG. 10, the opposing jaws 82, 84 can have clamping faces 83, 85 with an undercut in order to define a dovetail-shaped clamping area for engaging with various different mounting plates 90 which are typically provided with beveled edges. Those of ordinary skill in the art will recognize from the present disclosure that the specific configuration of the clamping faces 83, 85 can be varied although the undercut arrangement is common for engaging most types of mounting plates 90.

As shown in FIG. 13, the mounting plate 90 can include a slot or hole 92, and a threaded connector 94, such as a thumb screw, can be provided that extends through the slot or hole 92 for engaging in a corresponding opening provided at the bottom of many cameras 100. However, those of ordinary skill in the art will recognize that the specific connection of the camera 100 to the mounting plate 90 can vary and is not critical for the present arrangement.

Other types of camera attachments 80 can be used instead of the adjustable clamp. For example, a direct connection from the housing 12 to the camera using a threaded fastener to the standard tri-pod thread on the camera 100 or other connectors, clips or fasteners on the housing that engage the camera 100 or a mounting plate 90 attached to the camera 100.

In order to provide additional functionality, tripod/accessory female mount hole 15 for attaching the light assembly 10 to various third party tripods or accessories is also provided. This can ne in the form of a threaded hole with a standard tri-pod thread, for example ¼-20, or may be any other suitable type of attachment.

Still with reference to FIG. 10, a level 96 can optionally be provided on the housing 12 or mounting plate 90 which allows the user to determine whether or not the light assembly 10 with the attached camera 100 or smart phone 104 is being held in a level position.

Referring again to FIGS. 1-3, 5, 7, 9, 10, and 17, the smart phone bracket 110 is shown that is connectable to the base 32. The smart phone bracket 110 includes a mounting post 112 that is connectable to the base 32 at the first end 112A, and a smart phone clamp 114 that is connected to a second end 112B of the mounting post 112. The smart phone clamp 114 includes a moveable jaw 116 and an opposite jaw 118, with the moveable jaw 116 being movable toward the opposite jaw 118 to retain the smart phone 104 in a position with the lens 106 of the smart phone 104 aligned between the two legs 34, 36 and the base 32. In the illustrated embodiment, an optional pivotable cradle 120 is located between the smart phone clamp 114 and the second end 112B of mounting post 112. The pivotable cradle 120 is adapted to allow an angle adjustment of the pivotably cradle 120 toward and away from the U-shaped light frame 30 such that an inclination of the smart phone lens 106 of a smart phone 104 mounted in the clamp 114 is adjustable relative to the U-shaped light frame 30. Here, a pin connection 122 can be provided between the pivotable cradle 120 and the second end 112B of the mounting post 112. Alternatively, a ball-and-socket connection could be used to provide additional adjustability.

In a preferred arrangement, the moveable jaw 116 is spring biased toward the opposite jaw 118, which is fixed in position. Here, a spring, schematically illustrated as 124 in FIG. 10, can be used for biasing the moveable jaw 116. It is also possible to provide a different movement mechanism for the moveable jaw 116, such as a lead screw. It is also possible for both jaws 116, 118 to be biased toward one another via one or more springs.

Figure 6:
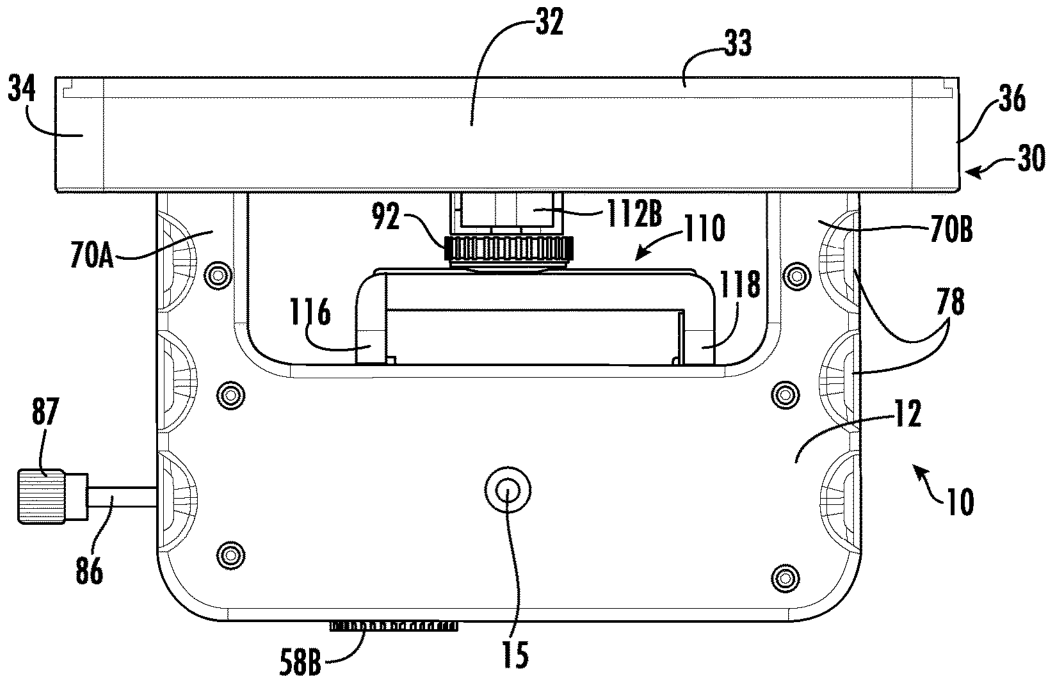
FIG. 6 is a bottom view of the light assembly shown in FIG. 1 where the smart phone bracket mounting thumb screw is shown along with the optional smart phone bracket.
Figure 7:
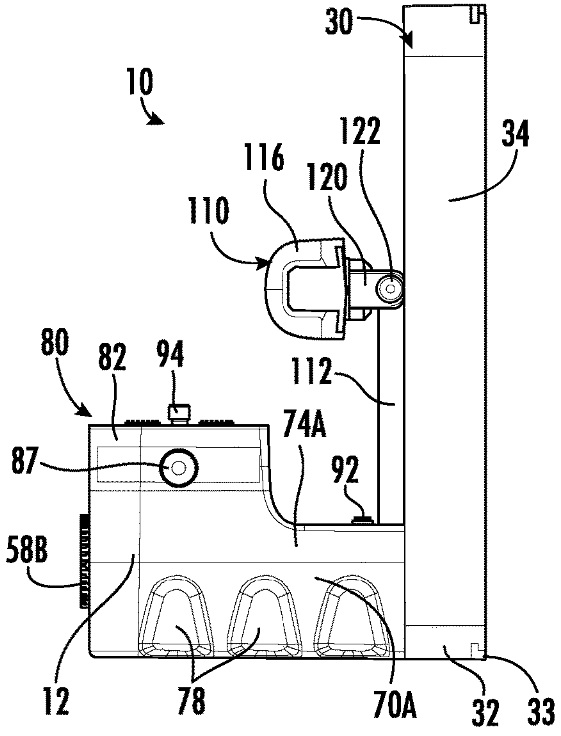
FIG. 7 is a right-side view of the light assembly of FIG. 1 shown with the optional smart phone bracket installed.

As shown in FIGS. 6 and 8, preferably the base 32 includes a connector 126 for releasably attaching the mounting post 112 to the base 32. The connector can be any type of connection such as a snap connection, threaded connection, bayonet connection, or any other suitable attachment. The illustrated embodiment utilizes a threaded connection in the form of a thumb screw.

Preferably the housing 12, legs 34, 36 and base 32 of the U-shaped light frame 30, and support arm 70A, 70B are made of a molded polymeric material. However, other materials could be used. The opposing jaws 82, 84 of the adjustable clamp 81 may be made of a polymeric material or of a metallic material in order to provide greater wear properties with respect to the clamping faces 83, 85 and the complementary threaded sections 82A, 84B.

In another aspect, a method of illuminating a scene for photography or videography is provided. The method includes providing the light assembly 10 including one or more of the features noted above. For use with a camera 100, the camera 100 is attached to the mounting plate 90, and the mounting plate 90 with the attached camera 100 is connected to the housing 12, for example via inserting the mounting plate 90 between the two opposing jaws 82, 84 of the adjustable clamp 81 located on the upper surface 14 of the housing 12. The two opposing jaws 82, 84 are clamped against the mounting plate 90 to affix the camera 100 to the light assembly 10, for example by rotating the knob 87. A length of the two support arms 70A, 70B is then adjusted such that the lens 102 of the camera 100 is positioned in proximity to or between the legs 34, 36 of the U-shaped light frame 30 in order to avoid shadowing. The scene is then illuminated with the LEDs 42 or other light source by turning on the on/off switch 64. The camera 100 is then activated in order to capture the scene.

The temperature intensity of the light provided by the LEDs 42 or other light source can be adjusted using the control interface 58, for example by pressing the central button 58A that toggles between the temperature and the intensity of the LEDs 42, and then adjusting the temperature, indicated at 62 to the desired temperature range, preferably between 3300 k and 5500 k, as well as then pressing the central button 58A again in order to toggle to control of the intensity and rotating the rotatable ring 58B in order to adjust the intensity, indicated at 63 to the desired range.

As shown in FIG. 15, a microphone 130 can be attached to the top of the camera 100 with the microphone 130 extending through the opening 38 at the top of the U-shaped light frame 30.

An alternate method is providing for illuminating a scene for photography or videography using the smart phone 104, for example as shown in FIGS. 5 and 9. Here, the light assembly as described above is provided and the smart phone mounting bracket 110 that has the first end 112A attached to the base 12, for example by using the thumb screw connector 126. The smart phone 104 is then clamped into the smart phone clamp 114 by moving, for example the movable jaw 116 outwardly, placing the smart phone 104 in position, and then allowing the moveable jaw 116 to be biased back into a clamping position, for example via the spring 124, to clamp the smart phone 104 in position. The smart phone 104 is clamped in position with the lens 102 of the smart phone 104 aligned between the two legs 34, 36 of the U-shaped light frame 30 as well as being above the base 32. The scene is then illuminated with the LEDs 42 in the same manner as discussed above, for example using the on/off switch 64 as well as the central button 58A and the rotatable ring 58B that are part of the user control interface 58 in order to adjust temperature and intensity as desired. The present light assembly 10 can therefore be used in a generally universal manner with most cameras or smart phones in order to provide adjustable illumination for photography or videography.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A light assembly, comprising:

a housing;

a U-shaped light frame connected at a front of the housing, the U-shaped light frame including a base and two legs that extend up from opposite ends of the base that define an opening at a top of the U-shaped light frame between the two legs and an open path defined through a space between the two legs that extends between a front and a back of the U-shaped light frame;

a printed circuit board (PCB) located in the U-shaped light frame and having a corresponding U-shape;

a plurality of light sources mounted to the PCB at a front thereof and directed in a direction of the open path in an opposite direction from the housing;

a filter or diffuser mounted to the front of the U-shaped light frame in front of the light sources;

a power source located in the housing and connected to a driver circuit for the light sources, and the driver circuit being electrically connected to the PCB to power the light sources;

two support arms connected between the housing and the base, the two support arms are length adjustable to allow adjustment of a distance between the housing and the U-shaped light frame; and at least one of:

a) a camera attachment on the housing to which a camera is adapted to be fastened in a position such that a camera lens of the camera is aligned between the two legs and above the base and is adjustable toward and away from the U-shaped light frame via the two length-adjustable support arms such that a lens of the camera is adapted to be aligned with or extends through the open path between the two legs, or b) a smartphone bracket that is connectable to the light assembly to which a smartphone is adapted to be fastened to retain the smartphone in a position with a lens of the smartphone adapted to be aligned with the open path between the two legs.

2. The light assembly of claim 1, wherein the camera attachment is provided and includes an adjustable clamp located on an upper surface of the housing, the adjustable clamp including two opposing jaws that are configured to engage and retain a mounting plate, which is adapted to be fastened to a camera, in a position such that a camera lens of the camera is aligned with the open path between the two legs and above the base and is adjustable toward and away from the U-shaped light frame via the two length-adjustable support arms.

3. The light assembly of claim 2, wherein the two opposing jaws on the upper surface of the housing are mounted for linear movement toward and away from one another, and a lead screw having first and second threaded sections is rotatably mounted in the housing, with the first threaded section engaging a complementary threaded section in a first one of the jaws and the second threaded section engaging a complementary threaded section in a second one of the jaws, and the first threaded section has an opposite-handed thread to the second threaded section.

4. A method of illuminating a scene for photography or videography, comprising:

providing the light assembly of claim 2;

attaching a camera to a mounting plate;

inserting the mounting plate with the attached camera between the two opposing jaws of the adjustable clamp located on an upper surface of the housing, and clamping the two opposing jaws against the mounting plate to affix the camera to the light assembly;

adjusting a length of the two support arms such that a lens of the camera is positioned in proximity to or between the legs to avoid shadowing;

illuminating the scene with the light sources; and activating the camera to capture the scene.

5. The method of claim 4, further comprising:

attaching a microphone to a top of the camera; and extending the microphone through the opening at the top of the U-shaped light frame.

6. The method of claim 4, further comprising:

adjusting a temperature and an intensity of the light sources using a user control interface located on the housing.

7. The method of claim 6, further comprising:

adjusting the temperature to between 3300 k and 5500 k, and adjusting the intensity from 5% to 100%.

8. The light assembly of claim 1, wherein the smartphone bracket is provided and includes a mounting post that is connectable to the base at a first end, and a smartphone clamp connected to a second end of the mounting post, the smartphone clamp including a moveable jaw and an opposite jaw, with the moveable jaw being moveable toward the opposite jaw to retain the smartphone on the smartphone bracket.

9. The light assembly of claim 8, further comprising a pivotable cradle located between the smartphone clamp and the second end of the mounting post, the pivotable cradle being adapted to allow an angle adjustment of the pivotable cradle toward and away from the U-shaped light frame such that an inclination of the smartphone lens is adjustable.

10. The light assembly of claim 8, wherein the moveable jaw is spring biased toward the opposite jaw which is fixed.

11. The light assembly of claim 8, wherein the base includes a connector for releasably attaching the mounting post to the base.

12. A method of illuminating a scene for photography or videography, comprising:

providing the light assembly of claim 8;

attaching the first end of the mounting post of the smartphone bracket to the base;

clamping a smartphone into the smartphone clamp with the lens of the smartphone aligned between the two legs and above the base;

illuminating the scene with the light sources; and activating the camera to capture the scene.

13. The light assembly of claim 1, wherein the front of the U-shaped light frame includes a receiving channel along outer edges of each of the legs and a stop along a lower edge of the base, and the filter or diffuser is slidable from above the U-shaped light frame into the receiving channels and is retained by a bottom edge of the filter or diffuser contacting the stop.

14. The light assembly of claim 1, wherein the two support arms each comprise:

an inner arm connected to one of the U-shaped light frame at the base or the housing;

an outer arm connected to an other of the U-shaped light frame at the base or the housing;

the outer arm includes a receiving space for the inner arm and the inner arm is slidably engaged in the receiving space of the outer arm with a friction fit in order to allow adjustment of the length of the support arm.

15. The light assembly of claim 1, wherein the power source is a battery located in the housing, and a charging connection is provided in the housing.

16. The light assembly of claim 15, wherein the temperature is adjustable from 2000 k-7000 k, and the intensity is adjustable from 0% to 100%.

17. The light assembly of claim 1, wherein the light sources are LEDs and the driver circuit for the LEDs includes a controller for adjustment of a temperature and an intensity of the LEDs, and a user control interface is located on the housing that is adapted to signal the controller to adjust the temperature and the intensity.

18. The light assembly of claim 17, wherein the user control interface comprises a central button that toggles control between the temperature and the intensity of the LEDs, a rotatable ring that surrounds the central button and rotates to adjust a selected one of the temperature or the intensity of the LEDs, and a display screen that displays the selected one of the temperature or the intensity and a setting for the temperature and the intensity.

19. The light assembly of claim 1, wherein the light sources are located on the base and the two legs.

* * * * *